J. LOVE.
VEHICLE LOADING ACCOMMODATOR FOR WAREHOUSES.
APPLICATION FILED DEC. 24, 1913.

1,112,543.

Patented Oct. 6, 1914.
2 SHEETS—SHEET 1.

WITNESSES:
F. C. Matheny
Frank Warren

INVENTOR
James Love
BY
C. D. Haskins
ATTORNEY

J. LOVE.
VEHICLE-LOADING ACCOMMODATOR FOR WAREHOUSES.
APPLICATION FILED DEC. 24, 1913.
1,112,543.
Patented Oct. 6, 1914.
2 SHEETS—SHEET 2.
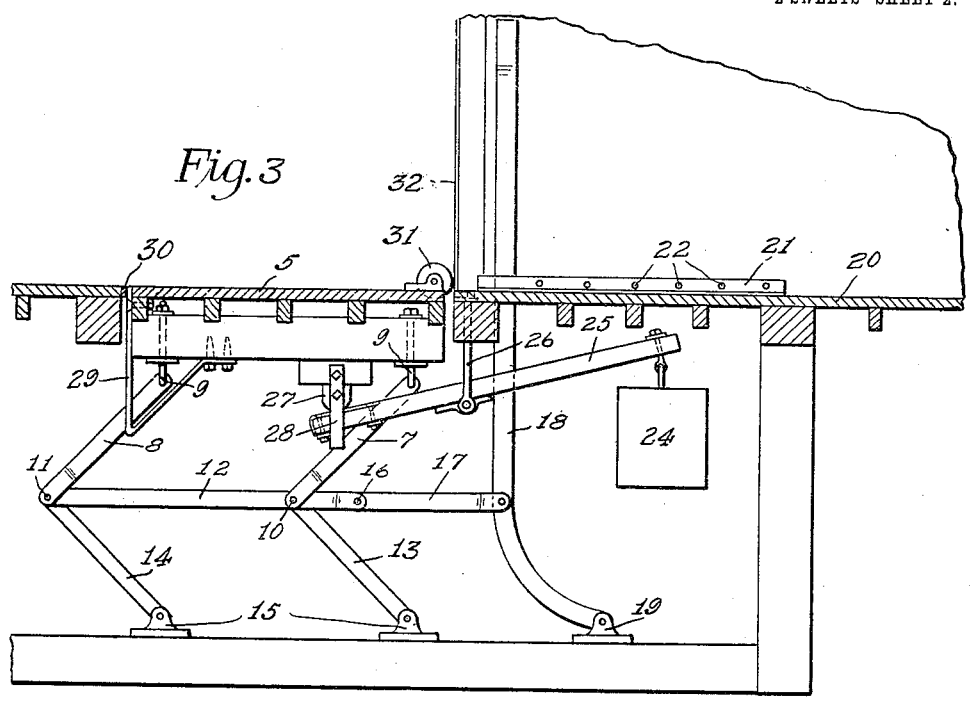
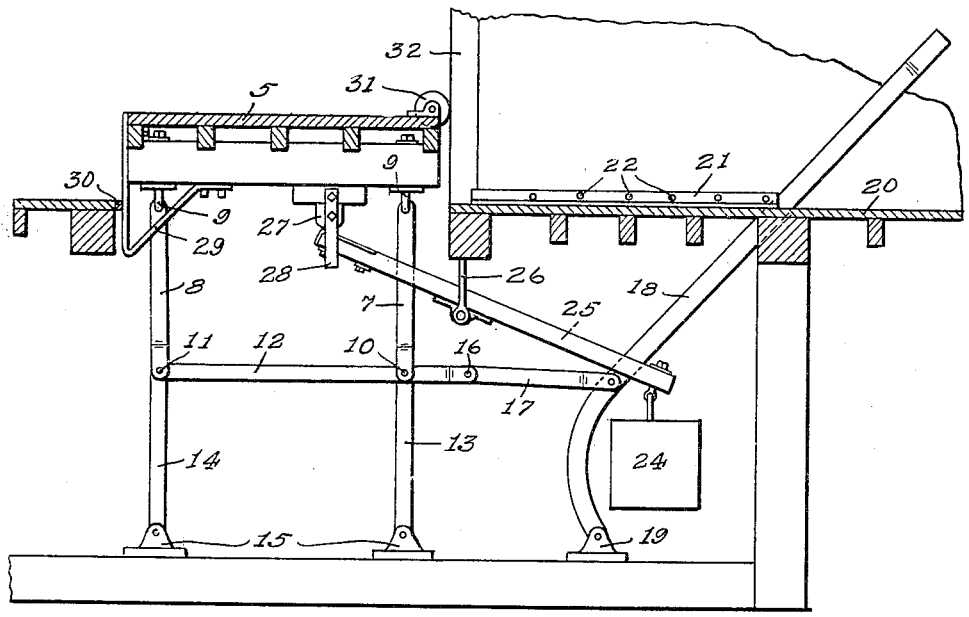
WITNESSES:
F. C. Matheny
Frank Warren
INVENTOR
James Love
BY
C. O. Haskins
ATTORNEY

UNITED STATES PATENT OFFICE.

JAMES LOVE, OF SEATTLE, WASHINGTON, ASSIGNOR OF ONE-HALF TO JOHN A. DEACON, OF SEATTLE, WASHINGTON.

VEHICLE-LOADING ACCOMMODATOR FOR WAREHOUSES.

1,112,543. Specification of Letters Patent. Patented Oct. 6, 1914.

Application filed December 24, 1913. Serial No. 808,548.

*To all whom it may concern:*

Be it known that I, JAMES LOVE, citizen of the United States, residing at Seattle, in the county of King and State of Washington, have invented a certain new and useful Improvement in Vehicle-Loading Accommodators for Warehouses, of which the following is a specification.

My invention relates to improvements in adjustable approaches and the object of my improvement is to provide an approach that may be embodied in a floor of a warehouse or of buildings where heavy freight is loaded on and unloaded from vehicles, such approach having suitable mechanism connected with one end thereof by which such end may be quickly and easily raised or lowered to be of the same elevation as is the floor of a vehicle that is to be loaded or unloaded. I accomplish this object by devices illustrated in the accompanying drawings in which—

Figure 1:
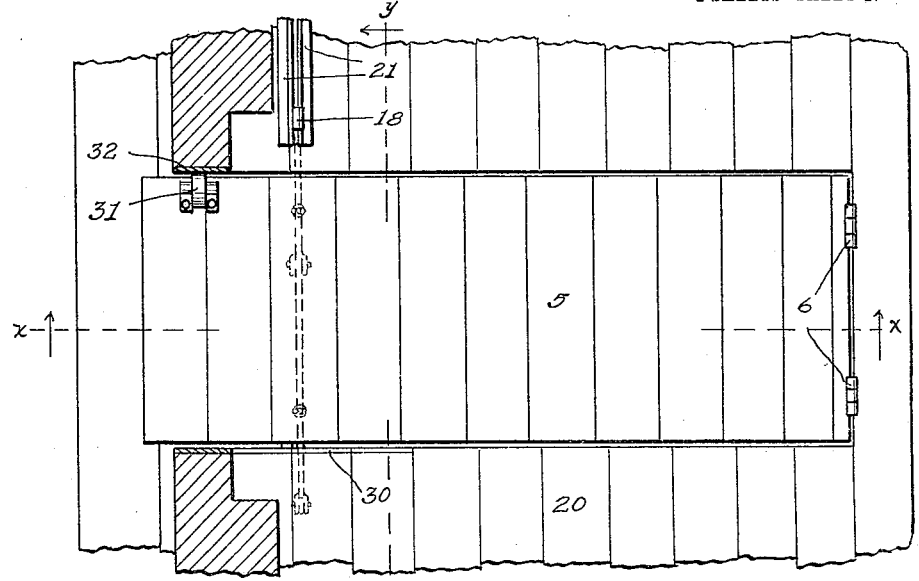
Figure 2:
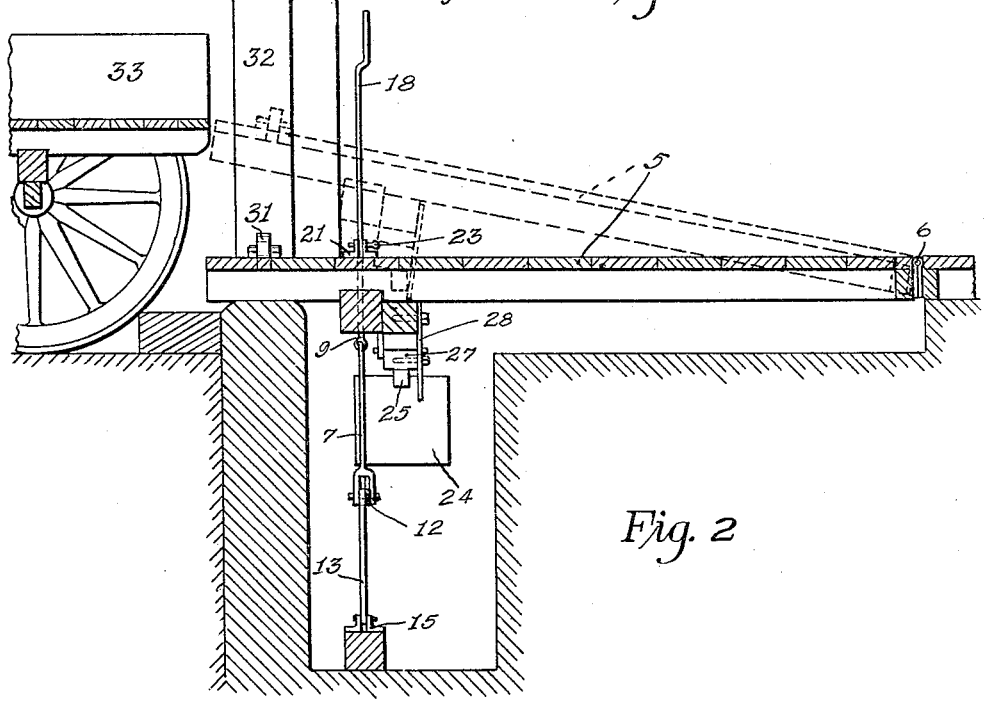

Figure 1 is a plan view of a fragment of a floor that is provided with an adjustable approach embodying my invention; Fig. 2, is a view in vertical section on broken line $x, x$ of Fig. 1, illustrating my approach as it appears when lowered to the level of the floor, another position that such approach may be made to assume being indicated by broken line, Fig. 3 is a view in vertical section on broken line $y, y$ of Fig. 1, illustrating my approach together with its actuating mechanism when such approach is in a lowered position, a view of the same in its most highly raised position being shown in Fig. 4.

Referring to the accompanying drawings in which like reference numerals indicate like parts, 5 is a platform that preferably may form a portion of a floor as the floor of a warehouse and preferably may be located near a doorway of such warehouse through which freight or other heavy commodities are loaded onto, or unloaded from vehicles of varying heights, such platform 5 having its inner end pivotally connected with the floor by hinges 6 and its outer end adapted to be moved upwardly or downwardly as may be required by the height of the vehicle that is being loaded or unloaded.

Two links 7 and 8 are connected with either side of the platform 5 adjacent to the forward end thereof by eye-bolts 9, 9 such links being adapted to extend downwardly and be connected by pivots 10 and 11 with a horizontal bar 12 and with the top ends of two other links 13 and 14 to form toggles, the lower ends of the two links 13 and 14 being pivoted in fixed bearing blocks 15, 15.

The cross-bar 12 extends outwardly past the pivot 10 and is connected by a pivot 16 with another horizontally disposed bar 17 which is pivotally connected with a hand lever 18 that has its bottom end pivotally secured in a fixed bearing bracket 19 and its top end projected upwardly through a slot in the floor 20 whereby said lever may be operated from above such floor, angle irons 21, 21 that are provided with perforations 22, 22 through which a pin 23 may be thrust to hold the lever 18 in any desired position being secured to the floor 20 on either side of said slot.

A counter weight 24 is suspended from one end of a lever arm 25 that is fulcrumed in a suitable bracket 26 and is adapted to have its other end bear upwardly on a block 27 that is provided on the lower side of the platform 5 as illustrated in Figs. 3 and 4 whereby a lifting force tending to raise the outer end of the platform 5 may be exerted, the counter-weight 24 being of such weight that but little force need be exerted on the lever 18 to raise the platform 5.

A guard bar 28 is provided to extend downwardly from the block 27 and prevent the end of the lever arm 25 from slipping off of such block 27 when the platform is raised as shown by broken lines in Fig. 2, and a guide bracket 29 is provided on one edge of the platform 5 adjacent to the forward end thereof and is adapted to bear against a metal strap 30 that may be secured to the adjacent edge of the floor 20 to steady the platform 5 and prevent sidewise movement of such platform when it is raised, a small wheel or roller 31 herein shown as adapted to roll against a door jamb 32 being provided on the opposite edge of the platform 5 to act conjointly with the bracket 29 in preventing such sidewise movement.

My adjustable approach is simple and easy to operate and when lowered may conveniently form a portion of the floor of the building in which it is used. If a truck or vehicle 33, as illustrated in Fig. 2, is of such height that it may not be conveniently loaded from the floor of the warehouse then the platform 5 may be raised by moving the top of the lever 18 away from such platform, as shown in Fig. 3, thus straightening the toggle links and forming an inclined approach, as illustrated by broken lines in Fig. 2.

Obviously the lever 18 may be moved much or little, as may be desired and may be secured in any position by the pin 23 thus to maintain the end of the platform 5 at any desired elevation.

If it is found advantageous to do so the several parts of my device may be so proportioned and arranged that the movable end of the platform 5 may be lowered below the level of the floor.

Manifestly changes in the details and form of construction of my device may be resorted to without departing from the spirit of my invention or sacrificing any of its advantages.

What I claim is:

1. In a structure of the class described, the combination with a platform, of a lever arm, toggle links articulated with said platform and with said lever arm whereby said toggle links may be deflected to move said platform vertically, a counter-weight whereby an upward pressure may be exerted on said platform, and a guide bracket adapted to extend downwardly from a side of said platform to prevent sidewise movement thereof.

2. A loading and unloading device comprising a platform hinged at its inner end, means for raising the outer end of said platform consisting of a plurality of pairs of toggle-links the lower member of each pair of links being pivotally secured at its lower end, a horizontal bar connected with the pivotal connection of each pair of links, a link connected to said horizontal bar, a lever arm connected to the link of said bar, a second lever fulcrumed below the platform and a counterweight carried by said second lever, said platform being provided with means for preventing sidewise movements of said platform as it is raised or lowered.

In witness whereof, I, hereunto subscribe my name this eleventh day of December, A. D., 1913.

JAMES LOVE.

Witnesses:
 F. C. MATHENY,
 A. HASKINS.

---

Copies of this patent may be obtained for five cents each, by addressing the "Commissioner of Patents, Washington, D. C."